United States Patent [19]

Anazawa et al.

[11] Patent Number: 4,664,681

[45] Date of Patent: May 12, 1987

[54] HETEROGENEOUS MEMBRANE AND PROCESS FOR PRODUCTION THEREOF

[75] Inventors: Takanori Anazawa, Urawa; Yoshiyuki Ono, Okegawa, both of Japan

[73] Assignees: Dainippon Ink and Chemicals, Inc., Tokyo; Kawamura Inst. of Chemical Res., Saitama, both of Japan

[21] Appl. No.: 793,733

[22] Filed: Nov. 1, 1985

Related U.S. Application Data

[63] Continuation of Ser. No. 603,293, Apr. 23, 1984, abandoned.

[30] Foreign Application Priority Data

Apr. 22, 1983 [JP] Japan .................................. 58-69900

[51] Int. Cl.$^4$ ............................................ B01D 53/22
[52] U.S. Cl. ............................................ 55/158; 55/16; 264/176.1; 264/122.1; 428/398
[58] Field of Search ................ 55/16, 158; 210/500.2; 428/398; 264/176 F, 177 F, 290.5, 291, 294

[56] References Cited

U.S. PATENT DOCUMENTS

| | | | |
|---|---|---|---|
| 3,133,132 | 5/1964 | Loeb et al. | 210/500.2 X |
| 3,677,881 | 7/1972 | Riordon | 428/398 |
| 4,020,230 | 4/1977 | Mahoney et al. | 55/16 X |
| 4,055,696 | 10/1977 | Kamada et al. | 428/398 |
| 4,239,793 | 12/1980 | Matsuura et al. | 55/16 X |
| 4,268,279 | 5/1981 | Shindo et al. | 55/158 X |
| 4,269,713 | 5/1981 | Yamashita et al. | 210/500.2 |
| 4,399,035 | 8/1983 | Nohmi et al. | 210/500.2 |
| 4,401,567 | 8/1983 | Shindo et al. | 210/500.2 |
| 4,405,688 | 9/1983 | Lowery et al. | 210/500.2 X |
| 4,421,529 | 12/1983 | Revak et al. | 55/16 |
| 4,472,175 | 9/1984 | Malon et al. | 55/158 X |
| 4,486,202 | 12/1984 | Malon et al. | 55/158 |
| 4,527,999 | 7/1985 | Lee | 55/158 X |

FOREIGN PATENT DOCUMENTS 878608  8/1971  Canada ................................ 55/158

*Primary Examiner*—Robert Spitzer
*Attorney, Agent, or Firm*—Sherman and Shalloway

[57] ABSTRACT

A heterogeneous membrane of a thermoplastic crystalline polymer composed of a microporous layer and a nonporous layer and having excellent properties, for example as a diaphragm for separating a gaseous mixture; and a process for production thereof. The heterogeneous membrane is in the form of, for example, a flat film or a tubular film (preferably a hollow fiber). The microporous layer contains pores with a diameter of 0.01 to 50 microns, whereas the nonporous layer does not substantially contain pores having a diameter of at least 30 Å and has a thickness of 0.01 to 1 micron. The heterogeneous membrane is characterized by having at least 3 times as high an apparent oxygen permeability coefficient $P(O_2)$ at 25° C. as a nonporous homogeneous membrane of the same material and an oxygen-nitrogen separation coefficient $\alpha$ ($O_2/N_2$) at 25° C., i.e. the ratio of the apparent oxygen permeability coefficient $P(O_2)$ to the apparent nitrogen permeability coefficient $P(N_2)$, of at least 1.2.

The heterogeneous membrane can be industrially produced easily and conveniently with a high efficiency by a melt-extrusion film-forming step, a stretching step and a heat-setting step under specified conditions.

16 Claims, No Drawings tion of the membranes, namely they are so-called isotropic membranes.

The common characteristic feature of the processes for producing these membranes is that in order to form open pores extending through the membranes and thus to develop stacked lamellar crystals of least defects, a thermoplastic crystalline polymer is melt-processed (spun, extruded or inflated) at a relatively low temperature at a high draft ratio with some quenching, thereafter, as required, heat-treated to develop stacked lamellar crystals further, then stretched somewhat in a manner of cold stretching to develop open pores, and then heat-set.

The present inventors made a detailed study of the relation between the fine structure of the polymer formed in each of the steps of the melting-stretching process and the processing factors in each step. This study has led to the surprising discovery that a heterogeneous membrane composed of a porous layer having fine pores with a diameter of 0.01 to 50 microns and formed thereon a nonporous thin film layer having substantially no pores, not a mere isotropic porous membrane, can be produced by melt-processing the starting polymer into a film at a somewhat high draft ratio with weak cooling, then as required heat-treating the film to such an extent as to be insufficient for complete growth of stacked lamellar crystals, then stretching the film somewhat in a manner of cold stretching, and thereafter heat-setting the stretched film.

In view of the fact that as is the case with the Loeb membrane, heterogeneous membrane can be obtained in the prior art only by a wet or semi-dry wet technique, the formability of a heterogeneous membrane by the aforesaid melting-stretching process is innovative. The present inventors have furthered their research and development efforts and arrived at the present invention.

Thus, according to this invention, there is provided a heterogeneous membrane having a coarse and dense heterogeneous sectional structure produced by melt-spinning a thermoplastic crystalline polymer or melt-extruding it into a flat or tubular film form at a high draft ratio with weak cooling, and stretching and then heat-setting the fibers or film, said heterogeneous membrane being characterized by (1) being composed of a microporous layer having pores with a diameter of 0.01 to 50 microns and a nonporous layer having a thickness of 0.01 to 1 micron and containing substantially no pores with a diameter of at least 30 Å, (2) having at least 3 times as high an apparent oxygen permeability coefficient at room temperature (25° C.) as a homogeneous membrane of the same material, and (3) having an oxygen-nitrogen separation coefficient at room temperature of at least 1.2.

According to another aspect of this invention, there is provided a process for producing a heterogeneous membrane having at least 3 times as high an apparent oxygen permeability coefficient at 25° C. as a homogeneous membrane of the same material and an oxygen-nitrogen separation coefficient at 25° C. of more than 1.2, which comprises melt-spinning a thermoplastic crystalline polymer having a maximum degree of crystallinity of at least 30% into hollow fibers or melt-extruding it into a flat or tubular film at a temperature ranging from Tm (melting point) to Tm +200° C. and a draft ratio ($D_f$) of from 20 to 10,000 while weakly cooling the vicinity of the extrusion hole; as required, heat-treating the fibers or film at a temperature ranging from Tg to Tm−10° C.; monoaxially stretching the fibers or film at a temperature of from Tg−50° C. to Tm−10° C. and a stretch ratio of from 1.1 to 5.0; and heat-setting the stretched fibers or film at a temperature ranging from the stretching temperature to the melting point of the polymer, thereby to form a heterogeneous structure composed of a nonporous layer and a microporous layer in the thickness direction of the membrane.

The term "apparent permeability coefficient", as used herein, denotes the permeability coefficient which is calculated on the assumption that the thickness of the entire heterogeneous membrane (nonporous layer+microporous layer) is the thickness of the nonporous layer because the thickness of the nonporous layer in the heterogeneous membrane is difficult to determine.

The present invention will be described below in detail.

Membranes have long been classified into nonporous "homogeneous membranes" and "porous membranes", and the latter have been classified into "open cellular membranes" having the pores extending through the membranes, "semi-open cellular membranes" in which the cells are open to one side of the membrane surface, and "closed cellular membranes" in which the cells are independent from each other and are not open to the membrane surface. On the other hand with the advent of membranes of complex structures such as the Loeb membrane in recent years, membranes having no structural change in the thickness direction have been called "isotropic membranes", those having some structural change in the thickness direction, "heterogeneous membranes" (also known as non-symmetric membranes), and those obtained by bonding different materials, "composite membranes".

The membrane of this invention is typically a heterogeneous membrane composed of a microporous layer (also called a sponge layer) and formed on it, a nonporous layer (also called a dense layer) with substantially no pores which becomes an active layer for gas separation.

The structure of the heterogeneous membrane can be varied depending upon the cooling conditions during melt-molding and other manufacturing conditions. For example, there can specifically be produced (A) a heterogeneous membrane composed of an open-cellular microporous layer and on both surfaces of it, a thin film layer having no pores, (B) a heterogeneous membrane composed of an open cellular microporous layer and formed on one surface of it (when the membrane is in the form of a hollow fiber, the outside or inside surface), a thin film layer having no pores, and (C) a heterogeneous membrane of such a structure that since the individual pores in the open-cellular microporous layer are open only to one surface of the membrane, a gas which permeates the membrane should pass through the nonporous layer at least once.

The heterogeneous structure of the membrane or the presence of a thin surface film can be directly ascertained by observing the surface or the cross section of the membrane under a scanning electron microscope(-SEM).

No definite reason has yet been able to be assigned to the formation of the finer morphological structure or the heterogeneous structure of the heterogeneous membrane of this invention, but the microporous layer of the heterogeneous membrane of this invention is based presumably on the same principle as that of molding an

HETEROGENEOUS MEMBRANE AND PROCESS FOR PRODUCTION THEREOF

This application is a continuation, of application Ser. No. 603,293, filed Apr. 23, 1984, now abandoned.

This invention relates to a novel heterogeneous membrane for use in separating gases, and a process for producing the heterogeneous membrane by a melt-processing technique.

A first object of this invention is to provide a heterogeneous membrane having excellent gas separating ability, a high gas permeating speed and excellent mechanical properties.

A second object of this invention is to provide a process for efficiently producing such a heterogeneous membrane, which process quite differs from conventional complex and inefficient ones.

The so-called membrane separation method for separation, purification and recovery of gases, water, solutions, etc. using gas permselective membranes, reverse osmosis membranes or ultrafiltration membranes has recently gained increasing acceptance in various fields because it has a greater effect of saving energy than a separating method based on the utilization of heat and no degeneration of substances owing to heat occurs. The membrane separation method for gases operates on the principle that a specified gas is selectively sorbed and dissolved on the surface of a membrane, then caused to diffuse through the membrane and to the other surface of the membrane and desorbed on the other surface of the membrane. Accordingly to increase the efficiency of separation, the time required for diffusion through the membrane must be shortened. In other words, an important problem in producing a gas separating membrane of high performance is to reduce its thickness. Many attempts have been made to achieve this objective. Loeb et al. proposed in U.S. Pat. No. 3,133,132 the so-called Loeb membrane which is a heterogeneous reverse osmosis membrane of acetyl cellulose composed of a dense layer (skin layer) and a porous layer (sponge layer). Thus, they succeeded in developing a membrane having a thin separation layer (active layer) and high mechanical strength (self-supporting ability), and contributed much to the development of the membrane separation method. Since then, many materials for such a membrane have been suggested which include, for example, cellulose, cellulose acetate, aromatic polyamides, polyacrylonitrile, poly(methyl methacrylate), and polysulfone. With regard to the form of such a membrane, tubular films, particularly hollow fibers, have also been proposed in order to increase the membrane area over flat films.

Such conventional heterogeneous membranes are produced either by a wet or semi-dry film-forming technique using a solvent. The basic characteristic of such a technique is to extrude a solution (dope) of a polymer into a flat film or a tubular film (preferably a hollow fiber) and dip the extruded film in a non-solvent whereby the polymer is coagulated from the solvent incident to solvent exchange and a porous membrane is formed. Various means for phase separation in the above technique have been reported which include, for example, the lowering of the temperature, or a method involving using a dope containing a high-boiling non-solvent and causing phase separation (coagulation) of the polymer by the evaporation of the good solvent. The dense layer or nonporous layer is formed on the porous layer by drying only the surface of the film before the phase separation is induced by the aforesaid method. Thus, because of the use of an organic or inorganic solvent, these methods have the following common defects.

(1) The process steps and apparatus are complex.
(2) The solvent must be recovered and purified.
(3) The residual solvent in the membrane should be removed.
(4) Anti-pollution measures are required to prevent explosion, to control the health of the working personnel, etc.
(5) The productivity is low (the speed of production is slow).
(6) It is considerably difficult to reduce the thickness of the dense surface layer to less than 0.1 micron.

In recent years, a so-called composite membrane composed of an open-cellular porous membrane as a support and coated thereon a nonporous ultrathin film with a thickness of about 0.01 to 0.1 micron has been proposed in accordance with the same idea as the heterogeneous membrane. Its production requires a step of producing the porous supporting membrane and a step of coating the non-porous thin film on it, and these steps are difficult to practice successively in an uninterrupted manner. For this reason, this method involves more complex process steps than the aforesaid wet or semi-dry method. In particular, in the production of hollow fibers, it is considerably difficult for this method to coat a plurality of fibers simultaneously and form a thin layer of uniform thickness on the individual hollow fibers.

As stated above, conventional heterogeneous membranes or composite membranes and processes for their production have many defects. The present inventors thought that if a heterogeneous membrane having excellent permeability and mechanical properties can be produced by a melt-processing technique without using a solvent, it would be possible to provide an industrially advantageous and efficient process for producing excellent heterogeneous membranes. Based on this thought, they studied a process which is quite different from conventional ones and involves treating a thermoplastic crystallizable polymer as a film-forming material by melt-processing, heat-treatment, stretching, etc. to form a higher structure having a stacked lamellar structure, and stretching this structure to form a heterogeneous membrane having voids of a low gas permeation resistance in the membrane (unless otherwise specified, this process will be referred to hereinbelow as a melting-stretching process).

Open-celled porous membranes by the melting-stretching process based on a similar principle to the above and processes for production thereof have already been known, for example, from Canadian Pat. No. 878,608 and U.S. Pat. No. 3,801,692 which disclose porous films of polypropylene and polyethylene, U.S. Pat. No. 4,055,696 which discloses porous hollow fibers of polypropylene, U.S. Pat. No. 4,401,567 which discloses porous hollow fibers of polyethylene, and U.S. Pat. No. 3,513,110 which discloses porous hollow fibers of polyamides and polyesters.

The common characteristic feature of the above-exemplified porous membranes produced by the melting-stretching process is that the pores extend through the membrane, namely they are so-called open-celled porous membranes. They are also common in that the pores are uniformly distributed in the thickness direcopen-cellular porous membrane as described, for example, in the above-cited Canadian Pat. No. 878,608.

Specifically, when the thermoplastic crystalline polymer is melt-extruded under a moderate stress with a moderate temperature gradient, stacked lamellar crystals develop in a direction at right angles to the film take-up direction. The crystals are grown by heat-treating the film as required. Subsequent stretching results in the formation of voids extending the microporous layer between the stacked lamellar crystals. When the resulting membrane is heat-set, the resulting pores are set which will not be closed again upon releasing the stress. On the other hand, the molecular and morphological structure of the nonporous layer of the heterogeneous membrane of this invention has not yet been elucidated. From the characteristics of the manufacturing process, for example, it is presumed that the nonporous structure is composed of oriented microcrystals having a fibrous structure which are based on the high orientation of the molecular chains of the polymer on the membrane surface.

It should be understood however that the present invention is in no way limited by the aforesaid theoretical determination of the mechanism of formation.

When actually produced by the process of this invention, the membrane of this invention becomes, in many cases, a mixture of the structures (A), (B) and (C) above, or a mixture of a major proportion of the aforesaid structures and a minor proportion of other various structures. For example, the microporous layer may not have completely open-cellular pores, and partly have a closed cellular structure, or open pores (to be referred to as pinholes) may form on the thin film layer on the surface. These structural imperfections may sometimes be difficult to locate by observation under a scanning electron microscope. But the presence or absence and the degree of the structural imperfections of the heterogeneous membrane can be clearly assessed by performing an experiment of gas permeation and measuring the permeation speed (or the apparent permeability coefficient) and the separation coefficient.

It is known that when a film of a polymer which is amorphous or has spherical crystals grown therein is stretched at a temperature below Tg, minute voids are formed inside the film depending upon the stretching conditions. These voids are so-called closed cells. However, when voids are formed in the film or hollow fibers by conventional known methods and a gas is passed through it, the speed of gas permeation rather decreases in many cases, and any increase in permeation speed is about 3 times at the highest. This is presumably because under conditions which cause formation of voids, the crystals are reduced in size and rearranged to hamper permeation of the gas.

The heterogeneous membrane of this invention quite differs from the aforesaid closed cellular membrane having voids formed therein both in morphology such as crystal structure and in gas permeating performance.

Separation (or concentration) of a gas by a polymeric membrane is considered to be based on the following different principles depending upon the differences in the size of pores present in the membrane.

(1) When no pore having a size of at least about 30 Å exists in the membrane, the gas permeates the membrane by a "dissolution-diffusion flow", and the permeability coefficient $P_o$ (unit: $cm^3$ (STP).cm/$cm^2$.sec.cmHg) of the gas is a value inherent to the polymer. The permeation speed R (unit: $cm^3$ (STP)/$cm^2$.sec. cmHg), i.e. $P_o/L$ (L being the thickness in cm of the membrane), becomes larger as the film becomes thinner. Furthermore, the oxygen-nitrogen separation coefficient $\alpha$ ($O_2/N_2$), i.e. $P_o(O_2)/P_o(N_2)$ [$P_o(O_2)$ and $P_o(N_2)$ respectively represent the permeability coefficients of oxygen and nitrogen] is also a value inherent to the polymer, and becomes constant irrespective of the membrane thickness. All general-purpose polymers now known have an $\alpha$ ($O_2/N_2$) of at least 1, usually 2 to 15. In other words, when air is caused to permeate a polymeric membrane having no pores, oxygen is enriched.

(2) When a gas permeates the membrane through pores therein having a diameter of about 30 Å to the mean free path (usually about 0.1 micron), the "Knudsen flow" becomes a main flow, and the separation coefficient (the ratio of apparent permeability coefficients) is inversely proportional to the square root of the ratio of the molecular weights of the gases, namely $\alpha$ ($O_2/N_2$)=$\sqrt{28/32}$=0.935. Hence, the permeated air becomes oxygen-poor.

(3) When the diameter of pores extending through the membrane is larger than the mean free path, the gas flow is called "Poiseuille flow", and the $\alpha$ ($O_2/N_2$) is 1. Hence, no change occurs in the composition of the permeated air.

When a gas permeates a heterogeneous membrane composed of a microporous layer and a nonporous layer in the direction of the thickness of the membrane, the permeation through the nonporous layer becomes a rate-controlling step, and the permeation speed or the separation coefficient is in practice determined by the "dissolution-diffusion flow" through the nonporous layer.

The thickness L of the nonporous layer determining the gas permeation performance of the heterogeneous membrane is usually difficult to measure directly. Hence, the permeating property of the membrane is assessed by the permeation speed R which does not require consideration of the thickness of the nonporous layer, or by the "apparent permeability coefficient P" obtained by multiplying R by the apparent thickness of the heterogeneous membrane (nonporous layer+microporous layer). The apparent permeability coefficient becomes higher as the nonporous layer becomes thinner. Even when pinholes exist in the nonporous layer, its thickness can be estimated by the following equation which is obtained by using the measured oxygen and nitrogen permeability coefficients and their apparent permeability coefficients and solving the simultaneous equations.

$$L = \left\{ 1 + \frac{(\alpha - \alpha')\beta}{\alpha(\alpha' - \beta)} \right\} \times \frac{P_o(O_2)}{P(O_2)} \times Lt \times \frac{A}{N}$$

wherein $\alpha = \dfrac{P_o(O_2)}{P_o(N_2)}$:

the separation coefficient of the heterogeneous membrane, $\alpha' = \dfrac{P(O_2)}{P(N_2)}$ : the measured separation factor, $\beta$=0.935: the separation coefficient of the Knudsen flow, $P_o(O_2)$, $P(O_2)$: the oxygen permeability coefficient, Lt: the apparent thickness of the heterogeneous membrane (the unit is arbitrary), A: the proportion of the area of the nonporous thin film portion in the (apparent) surface area of the heterogeneous membrane, N: the number of nonporous layers which a gas permeates, and L: the thickness of each nonporous layer in the heterogeneous membrane (the unit is arbitrary).

The membrane of this invention has at least 3 times as high an apparent oxygen permeability coefficient as that of a homogeneous membrane of the same material. If there is no pinhole in the nonporous layer, the thickness of the nonporous layer can be reduced to less than one-third of the apparent membrane thickness, and to about 100 Å at the smallest (in which case, however, some pinholes form).

When pinholes form, the apparent permeability coefficient increases but at the same time, the separation coefficient decreases. Hence, the presence or absence of pinholes can be determined by measuring the separation coefficient. The present invention can provide a membrane having a separation factor of at least 1.2 and having separation ability equivalent or higher than the inherent separation factor of the material from which the membrane is made.

The separation factor varies depending upon the degree of orientation, the degree of crystallization, etc. of the material polymer, but the oxygen/nitrogen separation coefficient of the membrane may sometimes become at least 40% higher than that of a low-oriented amorphous homogeneous membrane of the same material.

When the oxygen/nitrogen separation coefficient, $\alpha$ ($O_2/N_2$), is less than 1.2, many pinholes (open cellular pores, etc.) are formed in the nonporous layer, and the proportion of a gas which permeates the membrane through the pinholes cannot be ignored with regard to the proportion of that portion which permeates the nonporous layer by dissolving and diffusion. The performance of the membrane having a separation coefficient of less than 1.2 is not practical.

It will be seen from the foregoing that to attain a high separation coefficient, the formation of pores (pinholes) having a diameter of at least about 30 Å extending through the membrane should be minimized. This is quite different from an open cellular porous membrane obtained by the melting-stretching process. To increase the permeation speed for provision of a cheap and compact gas separating device, it is necessary to reduce the thickness of the nonporous layer (the active layer for gas separation) which contributes to the separation and to make the microporous layer in a complete open-cellular structure as much as possible, thus inhibiting formation of closed cells.

A first technical feature of the present invention is to reduce the thickness of the nonporous layer with inhibition of pinholes by optimizing the conditions in the individual steps. A second feature is to form open cellular pores of low gas permeation resistance in the microporous layer.

The suitable diameter of the pores in the microporous layer (sponge layer) in the heterogeneous membrane of this invention is 0.01 to 50 microns, preferably 0.1 to 1 micron. If the pore diameter is less than 0.01 micron, it is difficult to increase the porosity of the microporous layer. Furthermore, the permeation resistance of the gas passing through the pores becomes high, and a heterogeneous membrane having a high permeation speed cannot be obtained. On the other hand, if the pore diameter exceeds 50 microns, the thin nonporous film layer formed on the surface of the sponge layer becomes liable to break, and pinholes frequently form in the heterogeneous membrane. It is difficult therefore to obtain a heterogeneous membrane having excellent separating ability.

The greatest factor which determines the diameter of the pores is the take-up stress during the melt-spinning or melt-extruding step, and the higher the stress, the smaller the pore diameter. Specifically, the resulting microporous layer has a small pore diameter when the polymer has a high molecular weight or a low melting temperature, the draft is high, or the cooling is relatively strong.

The suitable thickness of the nonporous layer in the heterogeneous membrane of this invention is 0.01 to 1 micron. If its thickness is below 0.01 micron, pinholes frequently occur, and a heterogeneous membrane having excellent separating ability cannot be obtained. If the thickness exceeds 1 micron, the permeation speed (or the apparent permeability coefficient) decreases and the resulting membrane is not practical for use in gas separation.

The shape of the heterogeneous membrane of this invention can be selected according to its end use. For example, it may be in the form of a flat film, a tubular film, or a hollow fiber. The hollow fiber suitably has an outside diameter of 5 microns to 1 mm, preferably 30 microns to 200 microns. A hollow fiber having an outside diameter of less than 5 microns or larger than 1 mm could be produced, but is disadvantageous in performance and the cost of production. The suitable thickness of the film (the wall thickness in the case of the hollow fiber) is 1 to 300 microns. If the thickness is less than 1 micron, satisfactory dynamic strength is difficult to obtain. If it is more than 300 microns, the apparent permeability coefficient of the resulting membrane decreases.

When a selected gas is separated (or concentrated) from or in a mixture of at least two gases by a membrane separating method, the separating device used is required to have a satisfactory gas selectivity, a good concentration ratio, a high permeation speed, etc. These properties are for the most part determined by the properties of the separating membrane. The heterogeneous membrane of this invention has good performance as a gas separation membrane. The selectivity of gas separation can be expressed by the separation coefficient (this is the same when at least one gas is selectively separated from a mixture of at least three gases). This separation factor is a value that is basically inherent to the polymer so long as the gaseous mixture to be separated follows the mechanism of dissolution-diffusion flow through the nonporous thin film layer, namely unless the separation is by permeation through the pores. This, however, may vary slightly depending upon the stereoregularity (tacticity) and the degree of crystallization of the polymer, the type, the size and the manner of arrangement of the crystals, etc. Accordingly, the heterogeneous membrane of this invention can be produced by selecting a material (polymer) suitable for a system in which it is to be used, for example the types of mixed gases, the mixing ratio, the types of the gases to be separated (concentrated or removed).

The heterogeneous membrane of this invention can be used, for example, for the production of oxygen-enriched air from air, the recovery of CO and $H_2$ from combustion exhaust gases, the recovery of ammonia from waste gases, the removal of $NO_2$ and $SO_2$ from waste gases, the separation of $CO/O_2$, the separation of $H_2/CO$, the separation of $H_2/O_2$, the separation and recovery of inert gases such as He, and the separation of methane/ethane.

The membrane of this invention can also be used for separation and concentration that can be realized by permeation through a nonporous thin film, for example to selectively remove a gas dissolved in a liquid, selectively dissolve a gas in mixed gases in a liquid, or to separate a selected liquid from a liquid mixture (so-called liquidliquid separation).

The membrane of this invention is especially useful for production of oxygen-enriched air from air by $O_2/N_2$ separation. Oxygen-enriched air is highly valuable for medical therapy or as burning air. For these purposes, the high oxygen concentration of the enriched air and the high speed of generating oxygen-enriched air are of paramount importance. In regard to these requirements, the membrane of this invention has the following excellent characteristics.

(1) Since the membrane can be prepared from materials having an excellent oxygen permeability coefficient $P_o$ ($O_2$) and a separation coefficient ($O_2/N_2$), a high oxygen concentration can be obtained [for example, poly-4-methylpentene has a $P(O_2)$ of $1.3 \times 10^{-9}$, and an ($O_2/N_2$) of 3.6].

(2) The thickness of the nonporous layer which is an active layer for gas separation can be very much reduced (for example, to about 500 Å), and the permeation speed per unit area of membrane can be increased.

(3) A thin hollow fiber having a large surface area can be produced (for example, of a hollow fiber having an outside diameter of 30 microns has a surface area per $m^3$ of about $1 \times 10^5$ $m^2$ which is about 100 times as large as that of a flat membrane).

(4) The membrane of the invention even in the form of a hollow fiber has high mechanical strength. This means that a pressure (primary pressure) to be exerted on the membrane can be increased.

(5) The manufacturing process is simple, and the productivity is high. Consequently, the cost of production is low.

In particular, the characteristics (2) to (5) are unique, and not possessed by heterogeneous membranes produced by the wet method or the semidry method. In an overall evaluation of the performance of membranes involving the permeation speed, the concentration of oxygen in oxygen-enriched air, etc. the membrane of this invention far surpasses the known heterogeneous membranes produced by the wet method or the semidry wet method and known composite membranes. Needless to say, the above characteristics of the membrane of this invention are exhibited not only as an oxygen-enriching membrane but also in the separation of other gases.

The membrane of this invention may be used as a gas separating membrane having a higher separation coefficient by treating it further, for example by vapor depositing a metal such as Ni, Ag or Pd on its surface, coating its surface with a polymer such as polyvinylpyridine or polyethylene glycol, or impregnating its sponge layer with a liquid such as liquid polyethylene glycol.

The heterogeneous membrane of this invention can be produced by going through the following three major steps.

(A) A step of melt-extruding a thermoplastic crystalline polymer at a temperature of from Tm to Tm+200° C. (Tm represents the melting point of the polymer) and a draft ratio of 20 to 10,000.

(B) A step of stretching the membrane obtained in step (A) at a temperature of (Tg−50° C.) to (Tm−10° C.) (Tg represents the glass transition temperature of the polymer) and a stretch ratio of from 1.1 to 5.0.

(C) A step of heat-setting the membrane stretched in step (B) at a temperature ranging from the stretching temperature employed in step (B) to Tm.

The thermoplastic crystalline polymer that can be used in this invention is selected from polymers having a maximum degree of crystallinity of at least 30%. They include, for example, polyolefins such as polyethylene, polypropylene, poly-3-methylbutene-1 and poly-4-methypentene-1; vinyl polymers such as polystrene and poly(methyl methacrylate); fluorine-containing polymers such as polyvinylidene fluoride and a fluorovinylethylene/tetrafluoroethylene copolymer; polyamides such as nylon 6, nylon 66 and nylon 12; polyesters such as polyethylene terephthalate; polybutylene terephthalate and polyethylene-2,6-naphthalate; polycarbonates such as poly-4,4'-dihydroxydiphenyl-2,2-propanecarbonate; polyethers such as polyoxymethylene and polymethylene sulfide; polyphenylene chalcogenides such as polythioether, polyphenylene oxide and polyphenylene sulfide; and polyether ether ketone (PEEK) having the structure

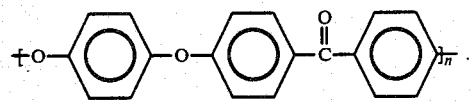

Blends of these polymers with each other, and copolymers of these having a maximum degree of crystallinity of at least 30%, and compositions comprising at least 70% of these polymers may also be used in this invention.

The melt-spinning temperature for production of hollow fibers (or the melt-extrusion temperature for film formation) is preferably higher than the melting point of the polymer but does not exceed the melting point by more than 200° C. The preferred spinning (or extrusion) temperature differs depending upon the crystallization speed of the polymer, the molecular weight of the polymer, the cooling conditions, the spinning speed, the draft ratio and treating conditions in subsequent steps. Generally, when polymers having a slow crystallization speed or polymers having a low molecular weight are used, low temperatures are preferred at relatively low spinning speeds or draft ratios. At a temperature more than 200° C. higher than the melting point, it is difficult to obtain membranes having a large gas permeation speed.

The draft ratio, which is the ratio of the extrusion speed to the take-up speed, is preferably from 20 to 10,000. For polymers having a high molecular weight, relatively low draft ratios of from 20 to 200 are suitable, but generally, draft ratios of at least 100 are preferred. If the draft ratio is at least 10,000, it is difficult to obtain a heterogeneous membrane having a high gas permeating speed.

The extrusion speed can be selected relatively arbitrarily. If it is too low, filament breakage tends to occur. It can be determined so as to meet the requirements for the melt-molding apparatus.

A spinning nozzle of an ordinary type such as a circular or bridge-type nozzle may be used to produce hollow fibers. For extrusion of films, an ordinary die for production of a flat film and a tubular film, such as a T-die or an inflation circular die may be used.

The outside diameter of the hollow fibers is suitably set at 5 microns to 1 mm depending upon the size of the nozzle, the draft ratio, etc. With outside diameters of less than 5 microns or more than 1 mm, it is difficult to obtain a heterogeneous membrane having a high permeation speed. The thickness of the hollow fibers or the film is suitably set at 1 to 300 microns. Outside this range, a good heterogeneous membrane is difficult to form, and its gas permeating speed decreases.

The important point which should be observed in practicing the process of this invention lies in the conditions for cooling the as-spun filaments (or the as-extruded film).

Production of open-cellular porous membranes by the known melting-stretching process is critically characterized by quenching the as-spun filaments (or the as-extruded film) with cold air, etc. When so-called quenching is to be carried out in the process of this invention, it is desirable to attach additional conditions to be described below. In the present invention, it is sufficient to cool the range of 1 cm to 30 cm below the nozzle opening (or the die exit) with weak air, and it is not necessary to positively cool that part of the filaments or film which has been cooled to below the melting point and solidified. When a polymer having a slow crystallization speed such as a polyester is used, the hollow fibers or film that has left the discharge opening is preferably kept warm to prevent cooling. In the case of a polymer having a high crystallization speed or a high melting point, such as polyethylene, polypropylene, poly-4-methylpentene-1 or polyoxymethylene, the as-spun filaments (or the as-extruded film) may simply be wound up at a high draft without performing any positive cooling. The optimum ambient temperature at which the as-spun filaments (or as-extruded film) is cooled, and the temperature of the cooling air are determined in relation to the type of the polymer, the spinning (or extruding) conditions such as the strength of the cooling air, or the subsequent steps, but are generally preferably from $(T_g-50°$ C.$)$ to $(T_m-50°$ C.$)$. When quenching is carried out with cooling air, or the ambient temperature is lower than $(T_g-50°$ C.$)$, or the ambient temperature or the temperature of the cooling air is higher than $(T_m-50°$ C.$)$, good heterogeneous membranes having a coarse and dense sectional structure are difficult to obtain, and there will result porous membranes in which sufficient pores are not formed in the microporous layer or pinholes are formed in the nonporous layer.

It is surprising that the process of this invention can give a heterogeneous membrane composed of a microporous layer and a nonporous layer formed thereon despite the fact that a step of forming a heterogeneous structure, as in the wet method, is not positively introduced.

No definite reason has yet been able to be assigned to this fact. But it is presumed from the characteristics of the cooling method that cooling of the vicinity of the extrusion opening with weak air produces a temperature distribution in the surface and inside of the membrane, and by stretching the membrane at a high draft ratio, only the surface of the membrane is highly oriented to form oriented crystals, and a laminated lamellar crystals (or the nuclei thereof) are developed in the inside of the membrane. This presumption is a theoretical study of the reason for the formation of a heterogeneous membrane, and needless to say, does not in any way bind the present invention.

As required, before step (B), the resulting hollow fiber or film is heat-treated. In the case of a polymer having a high crystallization speed such as a polyolefin, this heat-treatment is not always necessary because crystallization has already proceeded in the spinning (or extrusion) step with gradual cooling. With a polymer having a slow speed of crystallization such as a polyester, however, this heat-treatment is required. It is advantageous from the standpoint of the properties of the membrane and the uniformity of the product that even in the case of a polyolefin, the as-spun filaments are cooled with a slight degree of quenching and then heat-treated for a short period of time (several seconds to several tens of seconds). The suitable heat-treating temperature is from $T_g$ to $(T_m-10°$ C.$)$. If the heat-treatment is carried out excessively at high temperatures for long periods of time, many pinholes are undesirably formed in the resulting heterogeneous membrane. This is presumably because the molecular chains of the highly oriented part of the membrane surface is taken into the lamellar crystals in the inside of the membrane, and consequently, the thin surface film vanishes.

The heat-treatment may be carried out by an ordinary heating method, for example by using a heated roller, a hot air oven, or an infrared furnace. The heating method is not limited to a dry heat method, and may be effected with steam or in a wet condition.

The hollow fiber (or film) which has been heat-treated shows a fairly large elasticity recovery $(=100\times$ the amount of recovery/the amount of deformation$)$. Under the conditions of manufacturing the heterogeneous membrane in accordance with this invention, this value is usually 20 to 70% (at room temperature and 50% stretch).

The heat-treated hollow fiber or film is stretched in step (B) whereby voids are formed in the inside of the membrane to form a microporous layer (sponge layer) (this step will be referred to herein as a cold-stretching step). The cold-stretching temperature is preferably $(T_g-50°$ C.$)$ to $(T_m-10°$ C.$)$ because too low a cold-stretching temperature results in breakage of the nonporous layer (surface layer) and in the formation of pinholes. To increase the gas permeability speed of the resulting membrane, it is also possible to stretch the cold-stretched fiber or film at a temperature higher than the cold-stretching temperature but below $(T_m-10°$ C.$)$ without slackening the tension (this step will be referred to as a hot stretching step). The total stretch ratio DR in the cold stretching and hot stretching steps is suitably from 1.1 to 5.0. If the stretch ratio is too low, pores in the microporous layer are not fully opened. If it is too high, the nonporous layer undergoes breakage to develop pinholes, and the microporous layer also undergoes structural destruction. Accordingly, the resulting membrane has inferior gas separating ability with difficulty of gas permeation.

The cold- or hot-stretching may be carried out monoaxially without restricting the width of the film or while restricting its width to a fixed value. Or the hollow fiber or film may be continuously stretched by rollers. If the stretching temperature is low near Tg, too high a stretching speed results in the formation of many pinholes in the nonporous layer. Generally, the stretching speed is preferably 0.1 to 300%/sec. In the case of continuous stretching, it is advantageous from the standpoint of the uniformity of the product to fix the stretching point or narrow the stretching are by shortening each stretching region, using rollers having a small diameter, or using a stretching bar.

The stretching in step (B) may be two-step stretching composed of cold stretching and hot stretching as stated above, but as desired, may be carried out in more stages. Hence, the cold stretching may be effected in two or more stages. Generally, to inhibit stretching unevenness, it is preferred to shorten each stretching region. However, shortening the stretching region restricts the speed of stretching and reduces the speed of production. This is particularly outstanding during cold stretching at a temperature of (Tg+30° C.) or below. This problem can be solved by multiple-stage stretching.

The number of stretching stages is not particularly limited, but more than 20 stages are economically disadvantageous. The stretching temperatures in the individual stages are preferably the same, but if desired, may be made progressively higher. Stretching at a lower temperature than the stretching temperature in the preceding stage is undesirable because it tends to cause breakage of the fiber or film. The stretch ratio in each stage is preferably from 1.01 to 1.5, and the total stretch ratio should be from 1.1 to 5.0.

Voids formed in the membrane during the cold stretching step may sometimes be vanished by hot stretching in the subsequent step or by heat-setting in step (C). This tends to occur when the degree of crystal growth is low because of the absence of heat-treatment before step (B) or of the short heat-treatment time, when the stretch ratios in the cold and hot stretching steps are low, or when the temperature difference between the cold and hot stretching steps and the heat-setting is excessively large, or to a greater extent when these conditions overlap.

The vanishing of pores or the decrease of the porosity can be effectively prevented by performing the hot stretching in a multiplicity of stages. The number of stretching stages is preferably 2 to 20 although it should be determined by the extent of the aforesaid causes or the manner of their overlapping. No economical merit can be derived when the number exceeds 20. The stretching temperature in each step is preferably from Tn to (Tn+170° C.) in which Tn is the stretching temperature in the preceding stage. To produce the desired effect by a fewer number of stretching stages, the stretching temperature in each stage is more preferably from (Tn+40° C.) to (Tn+90° C.). The stretching ratio in each stage is preferably from 1.05 to 2.0, and the total stretch ratio in the cold and hot stretching steps should be from 1.1 to 5.0. When the hot stretching temperature is relatively low below Tg+30° C., stretching at high speeds, as is the case with the cold stretching, tends to result in filament breakage or the formation of pinholes. In this case, too, stretching is desirably carried out in a multiplicity of stages in order to increase the speed of production. The stretching temperature in each stage is preferably from Tn to (Tn+30° C.). In the multiple-stage stretching, the rotating speed of stretching rollers is higher toward later stages.

The diameter of the pores in the porous layer (sponge layer) can be determined by removing the surface layer by ion etching the surface of the membrane and then observing the revealed surface under a scanning electron microscope (SEM); or by cutting the membrane surface parallel or obliquely to the stretching direction at the temperature of liquid nitrogen, and observing the cut section with SEM. Preferably, the conditions are preset so that the short diameter of the pores becomes 0.01 to 10 microns in the process of this invention. The pore diameter can be set at a suitable value by the stress conditions during spinning (or extrusion) and the cold and hot stretching conditions.

The cold and hot stretching steps scarcely reduce the cross-sectional area of the hollow fiber or film, and therefore, its apparent density is lowered. This shows that voids are formed in the inside of the membrane and the membrane becomes microporous.

In the process of this invention, the stretched membrane is heat-set in step (C) so that the resulting pores are fixed even after removing the stress. The heat-setting temperature should be higher than the cold and hot stretching temperatures. Heat-setting is desirably carried out under tension for a period of at least 1 second. When hot stretching is skillfully performed, heat-setting is sometimes unnecessary. But even in this case, it is significant to perform heat setting. At this time, a deterioration in performance is only slight even if the heat-setting is carried out under no tension. When only the cold stretching is carried out without performing the hot stretching and the hollow fiber or film is to be used in a tensioned state, this heat-setting can be omitted, but the characteristics of the resulting membrane are not stable.

When in step (A), the as-spun fiber (or the as-extruded film) is quenched in the vicinity of the nozzle (or die) exit, any inconvenience caused to the fiber or film by quenching can be avoided by cold stretching the fiber or film at a stretching temperature of (Tg−20° C.) to (Tg+50° C.) after the quenching (this stretching will be referred to hereinafter as amorphous stretching), and at the same time heat-treating it at a temperature of from Tg to (Tm−10° C.). Without this amorphous stretching, many pinholes occur in the nonporous layer of the membrane obtained under the quenching conditions, and the membrane does not readily exhibit gas separating ability based on the principle of dissolution-diffusion. If the stretch ratio in amorphous stretching is excessively high, opencellular pores having low gas permeation resistance do not easily form. If the stretching temperature is below (Tg−20° C.), uniform stretching is difficult, and a good microporous layer is difficult to obtain. At a temperature of more than (Tg+50° C.), crystallization proceeds in this step and it is difficult to obtain a good microporous layer. The optimum stretch ratio differs depending upon the stretching temperature or the molecular weight of the polymer. When a low-molecular-weight polymer whose relaxation is fast is to be stretched at a high temperature, it is preferred to use a high stretch ratio. The aforesaid process including the quenching conditions is partly disadvantageous because of the need for an additional step of amorphous stretching, but is significant since the resulting heterogeneous membrane sometimes has a higher gas permeation speed and a higher gas separation coefficient than membranes obtained by the slow cooling method.

The manufacturing process described above in detail can give heterogeneous membranes having excellent gas separating ability. Whilst the present invention has been described mainly with regard to hollow fibers and flat films, it should be understood that the present invention can equally be applied to tubular films obtained by an inflation method (in this case, two films are treated at a time) or hollow fibers having irregularly-shaped cross sections other than the annular cross-section.

Needless to say, in industrial practice, the process for producing the heterogeneous membrane in accordance with this invention is carried out continuously.

The following examples illustrate the present invention in more detail.

EXAMPLE 1

Poly-4-methylpentene-1 having a melt index (ASTM D-1238) of 26 was spun through a bridge-type nozzle having a diameter of 5 mm at a spinning temperature of 290° C., a take-up speed of 580 m/min. and a draft ratio of 420 to obtain a hollow fiber having an outside diameter of 51 microns and a wall thickness of 9.8 microns. During the spinning, a region of 3 to 8 cm below the nozzle opening was weakly cooled with horizontally blown air at a speed of 1 m/sec at a temperature of 25° C. The hollow fiber was continuously heat-treated at constant length by rollers for each of the periods of time indicated in Table 1, then stretched 40% at room temperature and a stretching speed of 50%/sec with rollers with a distance of 5 cm, and without slackening the tension, heat-set at 200° C. for 3 minutes. The outside diameter and wall thickness of the resulting hollow fiber were the same as those of the as-spun unstretched hollow fiber. Observation under a scanning electron microscope (SEM) showed that pores having a size of more than 30 Å did not exist on the outside and inside surfaces of the hollow fiber, and pores having an average pore diameter of about 1 micron were observed in that section of the hollow fiber which was taken obliquely.

The oxygen permeability coefficient, nitrogen permeability coefficient, separation coefficient and permeation factor of the hollow fiber were determined by pressing the hollow fiber from inside under a pressure of 1 kg/cm$^2$ and measuring the flow rate of the gas which permeated the hollow fiber and came out onto the outside. The thickness and area of the hollow fiber were determined from the dimension of its cross section.

The results are shown in Table 1 together with data obtained with a nonporous homogeneous membrane as a referential example.

A sample which was most suitably heat-treated (Example 1-3) scarcely showed a decrease in separation coefficient from a nonporous homogeneous hollow fiber, but had about 23 times as high an apparent oxygen permeability coefficient as the homogeneous membrane. This shows that gas separation was effected at the nonporous layer. If it is assumed that the nonporous layer was formed on both surfaces of the membrane and its effective area (the proportion of that portion of the nonporous layer which was formed on the pores) was 50%, the thickness of the nonporous layer is calculated as about 0.1 micron. Table 1 suggests that as the heat-treating time becomes long, the separation coefficient decreases and the permeation speed increases. This is probably because many pinholes were formed and the proportion of the gas which permeated the pinholes increased. Observation of a sample which was heat-treated for a somewhat long period of time (Example 1-4) under SEM showed that about 10$^7$ pores with an average pore diameter of about 0.2 micron existed per cm$^2$ of the membrane surface (outside and inside surfaces). The oxygen permeation speed of this membrane, however, was more than 10 times smaller than the value calculated from the pore diameter and pore density of the membrane. This shows that most of the pores seen on the membrane surface were blocked up by the nonporous layer on the opposite surface and did not extend to the back surface.

COMPARATIVE EXAMPLE 1

A hollow fiber was produced in the same way as in Example 1 except that a region of 3 to 53 cm below the nozzle exit was quenched during the spinning by horizontally blown air at a speed of 3.5 meters/sec. The permeability coefficients, separation coefficient and permeation factor of the hollow fiber were as shown in Table 2. As shown in Table 2, when the heat-treating time is short, the apparent permeability coefficients are low, and when it is long, the separating coefficent becomes low owing to the formation of the open pores. This shows that the cooling conditions during spinning are important for producing a heterogeneous membrane, and that when an unstretched hollow fiber obtained under spinning conditions favorable for the formation of an open-cellular porous membrane is merely subjected to heat-treatment insufficient for forming an open cellular porous membrane, a heterogeneous membrane having good gas separating property cannot be obtained.

TABLE 1

| Sample No. (Example) | Heat treating time (sec.) | Oxygen permeability coefficient P(O$_2$)(*1) | Nitrogen permeability coefficient P(N$_2$)(*1) | Separation coefficient α(O$_2$/N$_2$) | Permeation factor (*2) |
|---|---|---|---|---|---|
| 1-1 | 0 | 4.5 × 10$^{-9}$ | 1.3 × 10$^{-9}$ | 3.6 | 3.4 |
| 1-2 | 1 | 7.8 × 10$^{-9}$ | 2.1 × 10$^{-9}$ | 3.6 | 5.8 |
| 1-3 | 5 | 3.1 × 10$^{-8}$ | 8.9 × 10$^{-8}$ | 3.5 | 23 |
| 1-4 | 30 | 5.0 × 10$^{-8}$ | 2.9 × 10$^{-8}$ | 1.7 | 36 |
| 1-5 | 1800 | 1.3 × 10$^{-7}$ | 1.1 × 10$^{-7}$ | 1.2 | 97 |
| Homogeneous membrane (*3) | — | 1.3 × 10$^{-9}$ | 3.5 × 10$^{-10}$ | 3.6 | |

(*1): Apparent permeability coefficients. The unit is cm$^3$ (STP) · cm/cm$^2$ · sec · mmHg.
(*2): The ratio of the apparent O$_2$ permeability coefficient to the permeability coefficient of the homogeneous membrane
(*3): The values of the spun fiber (nonporous homogeneous membrane) obtained in Example 1. Agreed with the values given in the literature.

TABLE 2

| Sample No. (Comparative Example) | Heat treating time (sec.) | Oxygen permeability coefficient $P(O_2)$(*1) | Nitrogen permeability coefficient $P(N_2)$(*1) | Separation coefficient $\alpha(O_2/N_2)$ | Permeation factor (*2) |
| --- | --- | --- | --- | --- | --- |
| 1-1 | 0 | $1.5 \times 10^{-9}$ | $4.2 \times 10^{-9}$ | 3.6 | 1.1 |
| 1-2 | 1 | $1.9 \times 10^{-9}$ | $6.6 \times 10^{-7}$ | 2.9 | 1.4 |
| 1-3 | 5 | $9.5 \times 10^{-8}$ | $8.6 \times 10^{-5}$ | 1.1 | 71 |
| 1-4 | 30 | $3.4 \times 10^{-6}$ | $3.4 \times 10^{-6}$ | 0.95 | 2500 |
| 1-5 | 1800 | $8.3 \times 10^{-5}$ | $8.8 \times 10^{-5}$ | 0.93 | 62000 |

(*1): Apparent permeability coefficients. The unit is $cm^3$ (STP) · $cm/cm^2$ · sec · mmHg.
(*2): $P(O_2)/P_o(O_2)$

EXAMPLE 2

This example shows that even when a positive cooling operation is not performed in a spinning step, a heterogeneous membrane suitable for gas separation can be formed.

A hollow fiber was produced in the same way as in Example 1-3 except that in the spinning step, no positive cooling operation was carried out, the spinning speed was changed to 840 m/min., and the draft ratio was changed to 610. Pores having a pore diameter of more than 30 Å were not seen to form on the surface of the hollow fiber obtained. As a result of a gas permeability test, the hollow fiber had a $P(O_2)$ of $1.9 \times 10^{-8}$, a $P(N_2)$ of $5.2 \times 1-^{-9}$, an $\alpha$ ($O_2/N_2$) of 3.6, and a permeation factor (increase ratio of the $O_2$ permeation speed) of 14. The hollow fiber obtained by melt spinning showed an elasticity recovery ratio at room temperature of 34% (at 50% stretch).

EXAMPLE 3

A hollow fiber was produced in the same way as in Example 1-3 except that in the spinning step, the draft ratio was varied by changing the wind-up speed. The gas permeating properties of the hollow fiber are shown in Table 3.

TABLE 3

| Sample No. (Example) | Take-up speed (m/min.) | Draft ratio | Separation coefficient ($O_2/N_2$) | Permeation factor (*) |
| --- | --- | --- | --- | --- |
| 3-1 | 70 | 51 | 3.6 | 3.5 |
| 3-2 | 150 | 109 | 2.1 | 16 |
| 3-3 | 300 | 220 | 2.8 | 41 |
| 3-4 | 580 | 420 | 3.5 | 23 |
| 3-5 | 1300 | 940 | 3.1 | 18 |

(*): $P(O_2)/P_o(O_2)$, which is the ratio of the apparent oxygen permeability coefficient $P(O_2)$ to the oxygen permeability coefficient $P_o(O_2)$ of a homogeneous membrane.

EXAMPLE 4

Polypropylene having a melt index of 9.0 and a density of 0.91 was spun through a bridge-type nozzle having a diameter of 5 mm at a spinning temperature of 240° C., a take-up speed of 580 m/min, a draft ratio of 370 and an ambient temperature of 23° C. without cooling air to give a hollow fiber having an outside diameter of 58 microns and a wall thickness of 10.2 microns. Without heat-treatment, the fiber was stretched 40% at room temperature, and while being under tension, heat-set at 150° C. for 3 minutes. The resulting hollow fiber had a $P(O_2)$ of $1.5 \times 10^{-8}$, a $P(N_2)$ of $4.9 \times 10^{-9}$, an $\alpha$ ($O_2/N_2$) of 3.0 and a permeation factor (an increase ratio of $O_2$ permeating speed) of 11. Since a nonporous homogeneous membrane of polyproylene has an $\alpha$ ($O_2/N_2$) of 3.0, it is seen that even without heat-treatment, a good gas separating membrane can be formed.

EXAMPLE 5

A hollow fiber was prepared by spinning and heat-treatment in the same way as in Example 1-3 except that in the spinning step, an annular slit nozzle having a diameter of 1 cm adapted for spontaneous inhaling was used, the wind-up speed was changed to 1000 m/min. and the draft ratio was changed to 670. The resulting fiber was stretched at each of the stretch ratios indicated in Table 4, and while being kept under tension, heat-set at 200° C. for 3 minutes. The gas permeating properties of the resulting hollow fiber are shown in Table 4. It is seen from the table that when the cold stretching ratio is increased, pinholes increase, and the separating coefficient of the resulting membrane decreases. At a stretch ratio of 2.5, the sample was broken. Observation of the sample of Example 5-3 under SEM showed that pores were seen to exist on the inside surface of the hollow fiber, but scarcely any pore was noted on its outside surface.

TABLE 4

| Sample No. (Example) | Stretch ratio | Outside diameter (microns) | Wall thickness (microns) | Separation coefficient | Permeation factor (*1) |
| --- | --- | --- | --- | --- | --- |
| 5-1 | 1.0 | 150 | 26 | 3.6 | 1 |
| 5-2 | 1.2 | 150 | 26 | 3.6 | 14 |
| 5-3 | 1.5 | 145 | 25 | 3.3 | 51 |
| 5-4 | 2.0 | 135 | 23 | 1.2 | 205 |
| Homogeneous membrane (*2) | — | 150 | 26 | 3.6 | (standard) |

(*1): $P(O_2)/P_o(O_2)$
(*2): Nonporous homogeneous membrane (the unstretched fiber obtained in the spinning step). The oxygen permeability coefficient of this membrane, $P_o(O_2)$, was $1.34 \times 10^{-9}$ (cm (STP) · $cm/cm^2$ · sec · cmHg).

COMPARATIVE EXAMPLE 2

A hollow fiber was produced in the same way as in Example 1-3 except that the cold stretching was carried out at a temperature of −30° C. and a stretch ratio of 1.3. The hollow fiber obtained had $P(O_2)$ of $3.6 \times 10^{-7}$, a $P(N_2)$ of $3.6 \times 10^{-7}$, an $\alpha$ ($O_2/N_2$) of 1.0 and a permeation factor (an increase ratio of $O_2$ permeation speed) of 270. These data show that the hollow fiber had a low separation coefficient, and many pinholes were formed. A cold stretch ratio of 1.4 could not be realized because of breakage.

EXAMPLE 6

Polyethylene having a melt index of 4.5 and a density of 0.96 was spun through a circular slit die having a diameter of 1 cm at a spinning temperature of 180° C., a take-up speed of 1300 m/min. and a draft ratio of 830 while introducing air by spontaneous inhaling. At this time, a region of 5 cm to 10 cm below the nozzle was cooled weakly by laterally blown air at a speed of 1 m/sec and a temperature of 20° C. The resulting unstretched hollow fibers had an outside diameter of 40 microns and a wall thickness of 6.9 microns. The unstretched hollow fiber was continuously heat-treated in a hot air constant temperature vessel at 90° C. with a residence time of 10 seconds, and then cold stretched at 20° C., a stretching speed of 50%/sec and a stretch ratio of 1.4 with a stretching area measuring 50 mm. Then, it was continuously heat-set by allowing it to reside for 10 seconds in a hot air constant temperature vessel at 110° C. The resulting hollow fiber had a $P(O_2)$ of $1.8 \times 10^{-9}$, a $P(N_2)$ of $7.2 \times 10^{-10}$, an $\alpha$ $(O_2/N_2)$ of 25, and a permeation factor (an increase ratio of $O_2$ permeating speed) of 18.

EXAMPLE 7

An unstretched hollow fiber spun by the same method as in Example 1-3 was continuously heat-treated at constant length at 190° C. for 30 seconds, cold stretched 20% continuously at room temperature and a stretching speed of 50%/sec, and immediately then hot-stretched to 100% based on the length before cold stretching at a temperature of 110° C. and a stretching speed of 100%/sec., and then maintained in this state at 190° C. for 1 minute. The resulting hollow fiber had an outside diameter of 49 microns and a wall thickness of 9.5 microns, and had a $P(O_2)$ of $1.9 \times 10^{-7}$, a $P(N_2)$ of $1.2 \times 10^{-7}$, an $\alpha$ $(O_2/N_2)$ of 1.6, and a $P(O_2)/P_o(O_2)$ of 145. When it is assumed that the nonporous layer existed on both surfaces of the membrane and the effective area of the membrane was 50%, the thickness of the nonporous layer is calculated from the above measured values as about 300 Å.

EXAMPLE 8

Polypropylene having a melt index of 3.5 and a density of 0.91 was melt-extruded through a T-die with a width of 20 cm at a temperature of 240° C., lightly cooled with an air knife with an air speed of 50 cm/sec. at a position 5 cm from the slit exit, and wound up at a take-up speed of 15 m/min. and a draft ratio of 140 to give a film having a thickness of 25 microns. The film was continuously heat-treated in a hot air constant temperature vessel at 110° C. with a residence time of 10 seconds, and then cold stretched at 23° C., a stretching speed of 50%/sec and a stretch ratio of 1.4 with a stretching area of 50 mm. Thereafter, it was continuously heat-set by allowing it to stand for 10 seconds in a hot air constant vessel at 120° C. The resulting film had a $P(O_2)$ of $2.2 \times 10^{-9}$, a $P(N_2)$ of $1.2 \times 10^{-9}$, an $\alpha$ $(O_2/N_2)$ of 1.9, and a permeation factor (an increase ratio of $O_2$ permeating speed) of 22.

EXAMPLE 9

Poly-4-methylpentene-1 having a melt index of 26 was melt-spun by using a nozzle of the bridge-type having a diameter of 5 mm at a spinning temperature of 290° C., a take-up speed of 580 m/min. and a draft ratio of 420 to give a hollow fiber having an outside diameter of 53 microns and a wall thickness of 9.3 microns. At this time, a region of 3 to 33 cm below the nozzle opening was quenched with horizontally blown air at a speed of 3 m/sec. at a temperature of 20° C. The resulting hollow fiber was continuously subjected to amorphous stretching using a roller unit at a temperature of 35° C. at a stretch ratio (DR) of 1.3. Then, without slackening the tension, the fiber was introduced into a hot air circulating constant temperature vessel at 200° C. and allowed to reside there for 5 seconds. The hollow fiber so heat-treated was then cold stretched at a stretch ratio of 1.4 and a temperature of 35° C. at a fiber delivery speed of 10 cm/sec with rollers having a gap of 10 cm, and then heat-set at 200° C. for 3 minutes while their length was maintained to give a hollow fiber having an outside diameter of 46 microns and an apparent wall thickness of 8.2 microns. The resulting fiber was whitened, and suggested the formation of pores. Observation of its inside and outside surfaces under SEM showed that scarcely any pores having a pore diameter of above 30 Å formed. When the hollow fiber was ion-etched, and its surface was observed under SEM, pores having an average diameter of about 0.3 micron were seen to exist at a high density. The oxygen and nitrogen permeability coefficients of the hollow fiber produced were determined by pressurizing the inside of the hollow fiber under a pressure of 1.0 kg/cm² and measuring the flow rate of the gas which permeated the hollow fiber and came out onto the outside. The thickness and area of the membrane were determined from a photograph of the section of the hollow fiber. The fiber was found to have a $P(O_2)$ of $8.2 \times 10^{-8}$, a $P(N_2)$ of $2.3 \times 10^{-8}$ and an $\alpha$ $(O_2/N_2)$ of 3.5. When the gas separating properties of the fiber was compared with those of a nonporous homogeneous membrane [$P_o(O_2) = 1.34 \times 10^{-9}$, $P_o(N_2) = 3.7 \times 10^{-10}$ and $\alpha$ $(O_2/N_2) = 3.6$], the oxygen permeating speed of the hollow fiber produced in this example was 61 times as high as that of the nonporous homogeneous membrane with scarcely any decrease in separating coefficient. If it is assumed that the non-porous layer was formed on both surfaces of the membrane and the effective membrane area was 50%, the thickness of the non-porous layer is calculated from the above measured values as about 340 Å.

EXAMPLE 10

A hollow fiber was produced in the same way as in Example 9 except that the cold stretch ratio was changed to 1.2 and subsequent to cold stretching, hot stretching was carried out at 190° C. at a stretch ratio of 1.5 (the total stretch ratio in the cold and hot stretching steps was 1.8). The resulting hollow fiber had a $P(O_2)$ of $2.2 \times 10^{-7}$ and an $\alpha$ $(O_2/N_2)$ of 1.7. The thickness of the nonporous layer from these values under the same assumption as in Example 9 was as small as about 230 Å. Observation of the hollow fiber under SEM showed that both on its inside and outside surfaces, pores having a long diameter of about 0.7 micron and a short diameter of about 0.2 micron existed at a density of about $10^7/cm^2$.

Since these fibers had the oxygen/nitrogen separating ability shown by the $\alpha$ value above, it is seen that most of the pores observed on the surface are so-called semi-open cellular pores which did not extend to the opposite surface.

EXAMPLE 11

A hollow fiber was produced in the same way as in Example 9 except that in the spinning step the take-up speed was changed to 120 m/min., the draft ratio was changed to 30, a region of 1 to 31 cm below the nozzle was cooled, and the amorphous stretch ratio was 1.1, 1.5, 2.0 and 3.5 respectively. Table 5 summarizes the dimensions of the cross-sections of the hollow fiber and the results of a gas permeabilty test on the fiber. Observation of the membrane obtained in Example 11-3 under SEM showed that scarcely any pores existed on the outside surface of the hollow fiber, but pores having a diameter of about 0.2 micron were noted on its inside surface. Table 5 demonstrates that even at a very low draft ratio, a heterogeneous membrane having a sufficient permeation speed and sufficient separating ability can be produced by performing amorphous stretching at a suitable stretch ratio. The results also suggest that if the amorphous stretching ratio is very low, a membrane having open cellular pores is obtained, and if the amorphous stretching ratio is very high, a porous layer inside is not formed.

TABLE 5

| Sample No. (Example) | Amorphous stretch ratio | Outside diameter (microns) | Thickness (microns) | Separation coefficient (*1) | Permeation factor (*2) |
|---|---|---|---|---|---|
| 11-1 | 1.1 | 225 | 26 | 0.94 | 95 |
| 11-2 | 1.5 | 190 | 33 | 1.3 | 20 |
| 11-3 | 2.0 | 165 | 19 | 3.5 | 19 |
| 11-4 | 3.5 | 125 | 14 | 3.6 | 1.1 |
| Homogeneous (*3) | — | — | — | 3.6 | (standard) |

(*1): $P(O_2)/P(N_2)$
(*2): $P(O_2)/P_o(O_2)$
(*3): Nonporous homogeneous membrane. $P_o(O_2) = 1.34 \times 10^{-9}$ (cm$^3$ (STP) · cm/cm$^2$ · sec · cmHg)

EXAMPLE 12

A hollow fiber was produced by the same procedure as in Example 9 except that the spinning was carried out without cooling of the as-spun fibers (Example 12-1) or a region of 3 to 8 cm below the nozzle opening was weakly cooled with air at a speed of a m/sec (Example 12-2). Table 6 summarizes the dimensions of the cross sections of the hollow fiber and the results of a gas permeability test on the fiber together with the data obtained in Example 9. It is seen that quenching is preferred, but even without a cooling operation, a membrane having separating ability can be obtained.

TABLE 6

| Sample No. (Example) | Cooling conditions (*1) | Outside diameter (microns) | Thickness (microns) | Separation coefficient ($O_2/N_2$) | Permeability $P(O_2)$ (*2) |
|---|---|---|---|---|---|
| 9 | Strong | 46 | 8.2 | 3.5 | $8.2 \times 10^{-8}$ |
| 12-1 | Weak | 44 | 8.8 | 1.5 | $1.6 \times 10^{-7}$ |
| 12-2 | None | 42 | 9.5 | 1.2 | $2.3 \times 10^{-7}$ |

(*1): See the descriptions of Examples 9 and 12
(*2): Apparent oxygen permeabilty coefficient Unit: cm$^3$ (STP) · cm/cm$^2$ · sec · cmHg Nonporous heterogeneous membrane: $P_o(O_2) = 1.34 \times 10^{-9}$

EXAMPLE 13

Polyethylene having a melt index of 0.9 and a density of 0.96 was melt-spun through a bridge-type slit die having a diameter of 5 mm under quenching conditions at a spinning temperature of 180° C. and a draft ratio (Df) of 120; 250° C. and Df 950; 320° C. and Df 5,600; or 320° C. and Df 950. The resulting hollow fiber was subjected to amorphous stretching at 20° C. at a stretch ratio of 1.1, and then heat-treated by allowing it to reside for 10 seconds in a hot air constant temperature vessel at 90° C. while its length was being maintained. Subsequently, the fiber was cold stretched at 20° C. at a stretch ratio of 2.0, and then heat-set by allowing it to reside for 10 seconds in a hot air constant temperature vessel at 110° C. while its length was being maintained. The properties of the resulting hollow fiber are shown in Table 7. It is seen that if the melt-molding temperature is too high, a sufficient permeating speed cannot be obtained, and when the melting temperature is high, the draft ratio is preferably maintained high.

TABLE 7

| Sample (Example) | Temperature (°C.) | Draft | Outside diameter (micron) | Thickness (micron) | Separation coefficient ($O_2/N_2$) | Permeability coefficient (*1) |
|---|---|---|---|---|---|---|
| 13-1 | 180 | 120 | 110 | 16 | 1.2 | $3.8 \times 10^{-9}$ |
| 13-2 | 250 | 950 | 35 | 6.6 | 2.4 | $1.7 \times 10^{-9}$ |
| 13-3 | 320 | 5600 | 14 | 2.9 | 3.2 | $6.0 \times 10^{-10}$ |
| 13-4 | 320 | 950 | 33 | 7.4 | 3.2 | $1.5 \times 10^{-10}$ |
| Homogeneous membrane (*2) | — | — | — | — | 3.2 | $1.0 \times 10^{-10}$ |

(*1): Apparent oxygen permeability coefficient $P(O_2)$
(*2): Nonporous homogeneous membrane of the same material.

EXAMPLE 14

Polypropylene having a melt index of 3.5 and a density of 0.91 was melt-extruded through a T-die having a width of 20 cm at a temperature of 240° C., and that site of the film 5 cm from the slit exit was quenched by using an air knife. It was wound up at a take-up speed of 15 m/min. and a draft ratio of 140 to form a film having a thickness of 25 microns. The film was subjected continuously to amorphous stretching at 35° C. and a stretch ratio of 1.5, and while being maintained under tension, brought into contact with a hot roll at 100° C. and simultaneously passed through a hot air constant temperature vessel at the same for 10 secondds. The heat-treated film was cold stretched at 23° C. and a stretch ratio of 1.4, and without changing its length, heat-set by allowing it to reside for 10 seconds in a hot air constant temperature vessel at 120° C. The resulting film had a $P(O_2)$ of $9.6 \times 10^{-9}$ and an $\alpha$ ($O_2/N_2$) of 1.6. Comparison of it with a homogenoeus membrane of the same material having a $P_o(O_2)$ of $1.0 \times 10^{-10}$ and an $\alpha$ of 3.0 showed that the heterogeneous membrane obtained had 96 times as high a permeation speed as the homogeneous membrane although there was a decrease in the separating coefficient.

EXAMPLE 15

Polypropylene having a melt index of 0.8 and a density of 0.91 was melt-extruded from a circular die having a diameter of 4 inches at a temperature of 240° C. The extruded molten tubular film was inflated by air blown from the inner circumference of the circular die to increase its diameter to 1.2 times. At the same time, the film was cooled and solidified by air blown from the inner and outer circumferences of the die. The extruded tubular film was collapsed by a roller, and taken up at a draft ratio of 150 to obtain a set of two films each having a thickness of 28 microns. The set of films as obtained was subjected to amorphous stretching, heat-treatment, cold stretching and heat-setting under the same conditions as in Example 14 to obtain a white film having a thickness of 25 microns. The film had a $P(O_2)$ of $1.1 \times 10^{-8}$ (110 times as large as that of the homogeneous film) and an $\alpha$ ($O_2/N_2$) of 1.3. It was therefore seen that the resulting heterogeneous film had gas separating ability. When the film was observed under SEM, pores in the outside of the treated set of two films existed at a density about 5 times as high as that on the inside of the set of two films.

EXAMPLE 16

A heterogeneous hollow fiber was produced by the same method as in Example 9 except that the unstretched fiber was cold stretched in 5 stages using a multiplicity of drive roller units. The drive rollers each had a diameter of 3 cm, and had a rubber press roller for preventing slippage of the sample. The sample length between the rollers was 10 cm, and the peripheral speeds of first to sixth rollers were 100, 114, 122, 129, 135, and 140 cm/second. At this time, the final cold stretch ratio was 1.4, and the stretching speed was 96%/sec. The cold stretching temperature was 35° C.

The resulting heterogeneous hollow fiber had a $P(O_2)$ of $8.0 \times 10^{-8}$ and an $\alpha$ $(O_2/N_2)$ of 3.5.

The product obtained by this example was much the same as the product of Example 9, but the speed of production increased over that in Example 9. The properties of the product were better than those of the product obtained in Comparative Example 3 below.

COMPARATIVE EXAMPLE 3

A hollow fiber obtained by spinning, amorphous stretchng and heat-treatment in the same way as in Example 9 was cold-stretched at a temperature of 35° C. and a stretch ratio of 1.4 with the sample length between rollers being kept at 100 cm while the peripheral speed of the delivery roller was kept at 1, 10, 100 and 200 cm/sec respectively. The stretching speeds are calculated as 0.48, 4.8, 48 and 96%/sec, respectively.

The cold-stretched fiber was heat-set in the same way as in Example 9, and the gas permeabilities of the products obtained were measured. The results are shown in Table 8. It is seen that since increased stretching speeds result in breakage or a decrease in separating coefficient, the stretching speed cannot be increased beyond a certain limit, and that when the stretching section is lengthened, the resulting product had reduced permeability.

TABLE 8

| Sample No. (Comparative Example) | Delivery speed (cm/sec) | $P(O_2)$ (*1) | $\alpha$ |
|---|---|---|---|
| 3-1 | 1 | $7.0 \times 10^{-9}$ | 3.8 |
| 3-2 | 10 | $7.6 \times 10^{-9}$ | 3.6 |
| 3-3 | 100 | $7.9 \times 10^{-9}$ | 3.0 |
| 3-4 (*2) | 200 | — | |

(*1): $cm^3$ (STP) $\cdot$ $cm/cm^2$ $\cdot$ sec $\cdot$ cmHg
(*2): Broken during the cold stretching.

EXAMPLE 17

A hollow fiber spun by the same method as in Example 9 was continuously subjected to amorphous stretching using a roller unit at a temperature of 35° C., a stretch ratio of 1.1 and a fiber delivery speed of 10 cm/sec. with the sample length between rollers being kept at 10 cm. Then, without slackening the tension, the fiber was continuously introduced into a hot air circulating constant temperature vessel at 200° C. while being stretched at a stretch ratio of 1.5 and allowed to reside in it for 11 seconds. The heat-treated hollow fiber was continuously cold-stretched using a roller unit at a temperature of 35° C., a stretch ratio of 1.2, and a fiber delivery speed of 10 cm/sec with the sample length between rollers being kept at 10 cm, and subsequently without slackening the tension, the fiber was hot stretched at 110° C. and a stretch ratio of 1.2 and then at 170° C. and a stretch ratio of 1.2, and then heat-set at constant length at 200° C. and a stretch ratio of 1.0 for 6 seconds. The resulting hollow fiber became white. Observation under SEM showed that pores having a short diameter of about 100 Å existed on the outside surface of the hollow fibers at a density of about $10^6/cm^2$ and no pore existed on its inside surface. The resulting heterogeneous membrane had a $P(O_2)$ of $8.8 \times 10^{-8}$ and an $\alpha$ $(O_2/N_2)$ of 3.6.

What is claimed is:

1. A heterogeneous membrane in the form of a flat film, a tubular film or a hollow fiber, said membrane having a microporous layer and a nonporous layer and being formed by melt-extrusion from a thermoplastic crystalline polymer and subsequent stretchings including amorphous stretching;

said microporous layer containing pores with a diameter of 0.01 to 50 microns, said nonporous layer containing substantially no pore with a diameter of at least 30 Å and having a thickness of 0.01 to 1 micron, said membrane having at least 3 times as high an apparent oxygen permeability coefficient $P(O_2)$ at 25° C. as a nonporous homogeneous membrane of the same material, and said membrane having an oxygen/nitrogen separation coefficient $\alpha$ $(O_2/N_2)$ at 25° C., which is the ratio of the apparent oxygen permeability coefficient $P(O_2)$ to the apparent nitrogen permeability coefficient $P(N_2)$, of at least 1.2.

2. The heterogenous membrane of claim 1 wherein one surface of the membrane is substantially a nonporous layer.

3. The heterogeneous membrane of claim 1 wherein both surfaces of the membrane are substantially a nonporous layer.

4. The heterogeneous membrane of claim 1 wherein the individual cells in the porous layer are open to one surface of the membrane, but the same cells are not open to both surfaces of the membrane, and a gas which permeates the membrane passes through the nonporous layer at least once without fail.

5. The heterogeneous membrane of claim 1 wherein the polymer has a maximum degree of crystallinity of at least 30%.

6. The heterogeneous membrane of claim 1 wherein the polymer is poly-4-methylpentene-1, polypropylene, polyethylene, or polyoxymethylene.

7. The heterogeneous membrane of claim 1 which is in the form of a hollow fiber having an outside diameter of 5 microns to 1 mm and a wall thickness of 1 micron to 300 microns.

8. The heterogeneous membrane of claim 1 which is in the form of a flat film having a thickness of 1 micron to 300 microns.

9. A process for producing a heterogeneous membrane in the form of a flat film, a tubular film or a hollow fiber, said membrane having a microporous layer and a nonporous layer and being formed by melt-extrusion from a thermoplastic crystalline polymer and subsequent stretching;

said microporous layer containing pores with a diameter of 0.01 to 50 microns, said nonporous layer containing substantially no pore with a diameter of at least 30 Å and having a thickness of 0.01 to 1 micron, said membrane having at least 3 times as high an apparent oxygen permeability coefficient $P(O_2)$ at 25° C. as a nonporous homogeneous membrane of the same material, and said membrane having an oxygen/nitrogen separation coefficient $\alpha$ $(O_2/N_2)$ at 25° C., which is the ratio of the apparent oxygen permeability coefficient $P(O_2)$ to the apparent nitrogen permeability coefficient $P(N_2)$, of at least 1.2 which comprises (A) melt-extruding a thermoplastic crystalline polymer at a temperature ranging from Tm to (Tm+200° C.) in which Tm represents the melting point of the polymer and a draft ratio of from 20 to 10,000 to form a membrane, (A') amorphous stretching the membrane obtained in step (A) at a temperature of from (Tg−20° C.) to (Tg+50° C.) and then heat-treating it at a temperature of Tg to (Tm−10° C.) in which Tg represents the glass transition temperature of the polymer, (B) stretching the membrane obtained in step (A') at a temperature ranging from (Tg−50° C.) to (Tm−10° C.) and a stretch ratio of from 1.1 to 5.0, and (C) heat-setting the membrane stretched in step (B) at a temperature ranging from the temperature employed in step (B) to Tm.

10. The process of claim 9 wherein the membrane obtained in step (A) is heat-treated at a temperature of from Tg to Tm−10° C. prior to step (B).

11. The process of claim 10 wherein the stretching in step (B) is carried out in 2 to 20 stages.

12. The process of claim 9 wherein the stretching in step (B) is carried out in 2 to 20 stages.

13. The process of claim 9 wherein the thermoplastic crystalline polymer has a maximum degree of crystallinity of at least 30%.

14. The process of claim 9 wherein the thermoplastic crystalline polymer is poly-4-methylpentene-1, polypropylene, polyethylene, or polyoxymethylene.

15. The process of claim 9 wherein step (A) comprises melt-extruding the thermoplastic crystalline polymer in the form of a hollow fiber, said fiber after stretching having an outside diameter of 5 microns to 1 mm and a wall thickness of 1 micron to 300 microns.

16. The process of claim 9 wherein step (A) comprises melt-extruding the thermoplastic crystalline polymer in the form of a flat film and wherein the flat film after stretching has a thickness of 1 micron to 300 microns.

* * * * *